Figure 1:
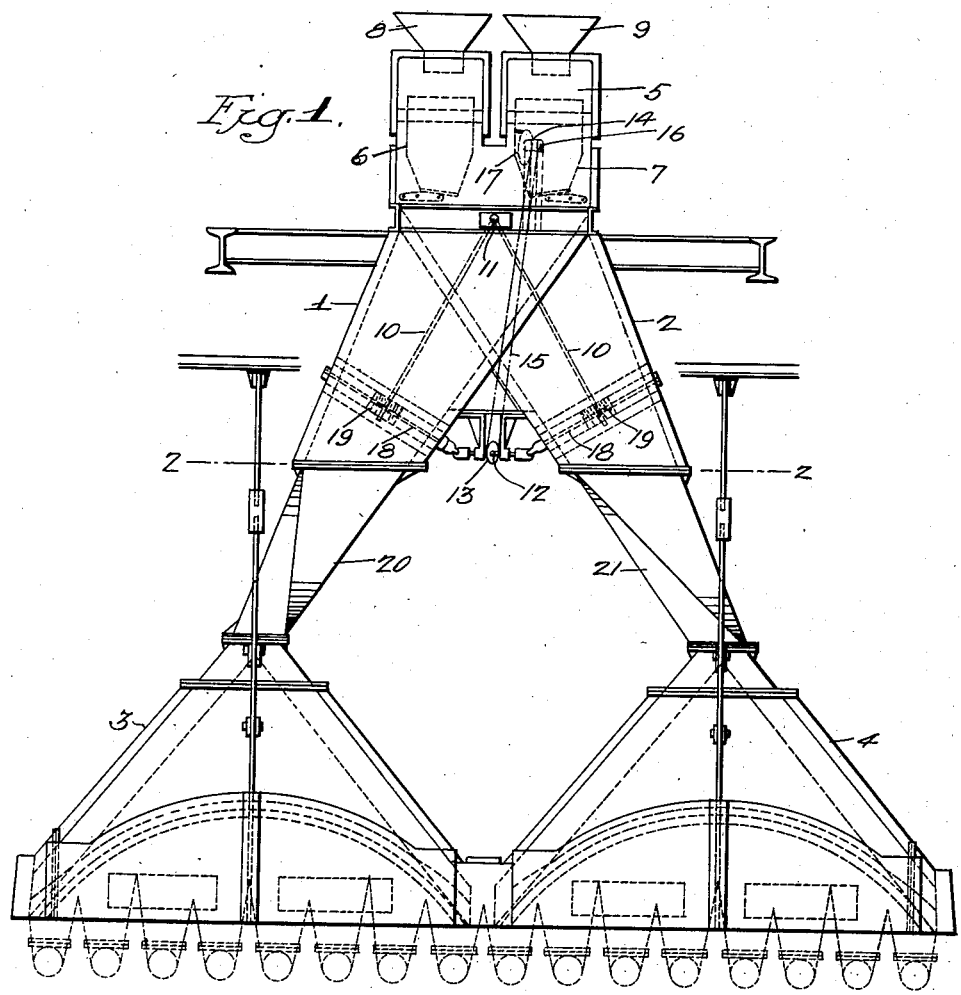

Jan. 22, 1935.  E. WHEELER  1,988,531
HOPPER, CHUTE, AND THE LIKE FOR FEEDING LUMPY,
GRANULAR, OR PULVERULENT MATERIAL
Filed Oct. 30, 1931   2 Sheets-Sheet 1

Inventor:
Edward Wheeler
by his Attorneys
Howson & Howson

Jan. 22, 1935.  E. WHEELER  1,988,531
HOPPER, CHUTE, AND THE LIKE FOR FEEDING LUMPY,
GRANULAR, OR PULVERULENT MATERIAL
Filed Oct. 30, 1931   2 Sheets-Sheet 2

Inventor:
Edward Wheeler
by his Attorneys
Howson & Howson

Patented Jan. 22, 1935

1,988,531

UNITED STATES PATENT OFFICE 1,988,531

HOPPER, CHUTE, AND THE LIKE FOR FEEDING LUMPY, GRANULAR, OR PULVERULENT MATERIAL

Edward Wheeler, Aldwych, London, England, assignor to American Engineering Company, Philadelphia, Pa., a corporation of Pennsylvania Application October 30, 1931, Serial No. 572,136
In Great Britain November 21, 1930

8 Claims. (Cl. 259—18)

This invention relates to improvements applicable to chutes for conducting lumpy, granular or pulverulent material, or mixed materials, in such a manner that with non-segregating chutes no grading or separation of the coarser or larger lumps from the finer or smaller lumps or dust shall occur, and the said improvements provide a plant which can advantageously be employed to facilitate mixing together or feeding different kinds of materials, for example, two kinds of materials such as coal and coke to be supplied to automatic stokers, so that the materials shall be delivered continuously along the entire width of a delivery mouth in predetermined proportions.

The said invention comprises means whereby the materials travelling to a non-segregating or other chute in unmixed streams or layers are given a rotary movement with respect to their path of travel. Thus the separate layers may be deposited one above the other at the upper end of the chute and the materials are spread out thereon with the lumps or pieces and the dust of approximately equal grades or sizes equally distributed, or not sorted or graded to a closer degree than that in which they were fed into the feed hoppers by which the said materials are conducted to the upper ends of the chutes.

Each hopper is preferably divided interiorly by an adjustable partition extending in a longitudinal or downward direction within the hopper, the upper end of the said partition dividing the hopper at this part into two mouths or feed openings of equal or unequal area as may be required. Or two or more partitions may be provided dividing the hopper into three or more longitudinal channels of any convenient relative proportions in cross section. Each partition may extend downwardly within the hopper to any convenient distance and its lower end can be fixed or may be adjustable transversely across the hopper so that the partition can be set parallel to the longitudinal centre line of the hopper or set at any convenient angle to this centre line so that different kinds of material fed separately into the hopper on opposite sides of the partition descend therein without coming into contact until the materials have descended below the lower edge of this partition.

In some cases, however, it is preferable to make the upper end of the partition adjustable transversely in the hopper, or this partition can be made adjustable in this manner at both ends thereof if required by the nature of the material which is to be fed to the hopper, and by suitable adjustment of the partition the proportions of two kinds or grades of materials, fed to the hopper on opposite sides of the partition, in any thin transverse layer in the lower part of the hopper can be controlled. It will be obvious that where convenient the sides or end walls of the hopper may be movable to vary the cross sectional area of the path along which the material is led.

The material of different kinds if allowed thus to pass out of the hopper on to a chute in separate streams side by side would remain thus separated in descending over the said chute and be delivered separately at the foot thereof. In order to ensure a distribution of each kind of the material along the whole length of the foot of the chute, a helical or curved guide partition may in some cases, e. g. when the hopper is of circular cross-section, be provided to deliver the different kinds of materials on to the upper end of the chute in superposed layers, without exercising any sorting or grading action on the materials passing on to this part.

If necessary more than one such partition may be provided. Then by reason of the construction of the chute, each kind of material is equally distributed to the foot of the chute from which the materials may emerge in separate layers or may become substantially uniformly mixed. Instead of employing helical curved guide partitions, the materials may be delivered in superposed layers by imparting to the walls of the hopper a helical formation, e. g. when the hopper is of rectangular cross-section.

In a convenient constructional arrangement in accordance with this invention, the mouths of two hoppers are arranged side by side, and materials are fed to these hoppers, for example, from weighing machines, at opposite ends of the mouths. The hoppers are inclined in opposite directions and are each divided interiorly in a downward or longitudinal direction by partitions separating the materials fed into each hopper from opposite ends of the mouths. These partitions may be adjustable independently, or may be geared or connected together so that they can be adjusted simultaneously by a single adjustment controlling device with which the apparatus is provided. At the lower end of the hoppers, chambers may be provided if necessary having curved guide vanes arranged therein so as to rotate the layers of material descending through the hopper into such relative positions that the layers pass out of the chambers on to the upper ends of chutes in superposed layers or the partitions alone are arranged to discharge the material in this formation of superposed layers.

Figure 2:
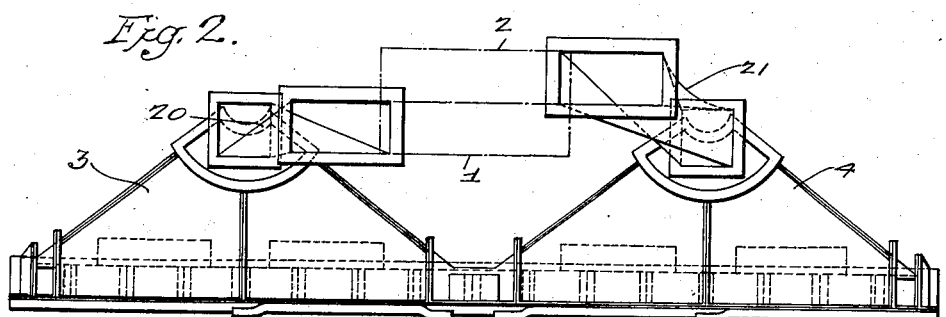
Figure 3:
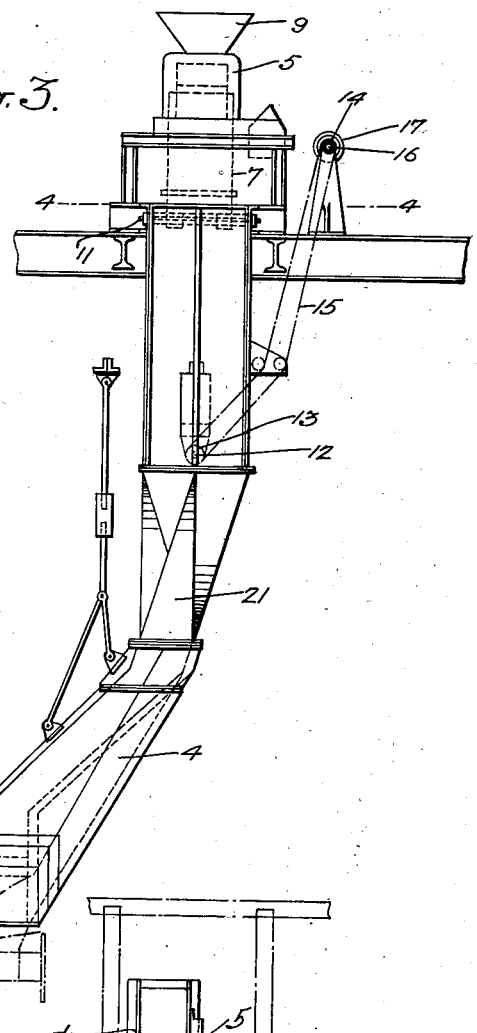
Figure 4:
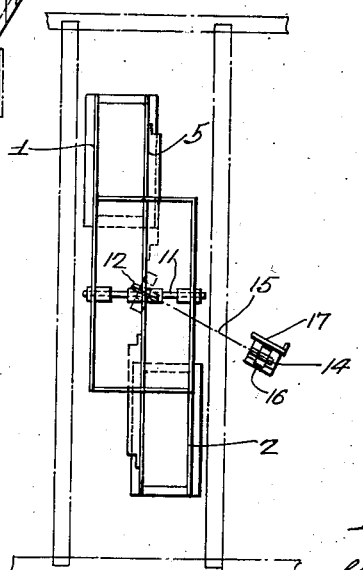

In the accompanying drawings which show by way of example a constructional form of conveyor plant embodying my invention:

Figure 1 is a front elevation thereof.
Figure 2 is a section (plan) taken on the line II—II, Figure 1.
Figure 3 is a side elevation, and
Figure 4 is a section (plan) taken on the line IV—IV, Figure 3.

As shown in Figure 1 the conveyor plant comprises two hoppers 1, 2, which respectively convey material such as for example, coal and coke to non-segregating chutes 3, 4 of any suitable construction. Arranged above each hopper 1, 2 is a casing 5 in which is arranged two automatic weighing and delivery apparatus 6 and 7 to which material is supplied from chutes 8 and 9. The hoppers 1 and 2 are offset, as shown more particularly in Fig. 4, and the automatic weighing and delivery apparatus 6 and 7 are so positioned thereabove that the material from each of said devices 6 and 7 discharges into both of the hoppers 1 and 2.

Each hopper 1, 2, is divided interiorly by an adjustable partition 10 that extends in a longitudinal or downward direction within the hopper, the upper end of the said partition dividing the hopper at this part into two mouths or feed openings that respectively receive the materials discharged from the delivery apparatus 6, 7. Referring to Fig. 1, it is seen that the automatic weighing and delivery apparatus 6 which receives one kind of material is positioned above and to the left of partitions 10 of hoppers 1 and 2 respectively, while apparatus 7 which receives another kind of material, is positioned to the right of said partitions. It therefore is evident that the left hand compartment of hoppers 1 and 2 respectively, receives material from apparatus 6, while the right hand compartment thereof receives material from apparatus 7. The partitions are pivotally mounted at 11 and are provided with means for adjusting the positions of the partitions in the hoppers in order to vary the relative rate of feed of the materials supplied thereto. Any suitable means for adjusting the positions of the partitions may be employed.

A preferred form of adjusting means, as shown comprises a shaft 12 having keyed thereon a wheel 13 that is rotated from a wheel 14 by a chain drive 15, the said wheel 14 being keyed on a shaft 16 rotated by a hand wheel 17. The shaft 12 is connected at each of its ends by a universal coupling to shafts 18 that extend across the hoppers 1, 2 and through screw threaded bushes in the partitions 10, the said shafts 18 having worms 19 that engage the screw threaded bushes. Thus rotation of the hand wheel 17 is transmitted to the shafts 18 and worms 19 that thereby adjust the positions of partitions 10.

After the materials supplied respectively from the weighing and discharge apparatus 6, 7, to the hopper pass downwardly beyond the partition 10 the two materials will come into contact and the materials would normally be fed to the chutes 3 and 4 in such a manner that they would be fed to different parts of the chute. In order therefore that the materials may be fed in superposed layers to the said chutes 3 and 4, the lower parts 20, 21 respectively of the hoppers 1, 2, are given a helical formation whereby the contacting faces of the two materials are rotated through an angle of substantially 90°.

It is obvious that although an apparatus having two hoppers has been described, one hopper or more than two hoppers can be equally advantageously employed. Moreover two or more substantially parallel partitions may be arranged in each hopper.

Means are thus provided for delivering different kinds of materials supplied in ungraded lumps or pieces in a continuous stream in uniform proportions without any separation or sorting of the materials into different grades or sizes. By means of this improved apparatus the proportions of the materials travelling through the hopper compartments and delivered therefrom on to the upper end of the chute can also be varied from time to time. Also the materials can be delivered in layers to the chute without mixing and in travelling down the chute retain this layer formation in which they are delivered to apparatus supplied by the chute, the order in which the layers are arranged one above the other being determined by the relative positions of the hoppers and the chutes.

What I claim is:—

1. In a device of the class described, the combination of one or more hoppers, each of said hoppers having a receiving chamber and a mixing chamber, an adjustable partition provided in the receiving chamber of each of said hoppers for dividing the latter into two compartments, means for depositing material of one kind into one of the said compartments of each hopper, and means for depositing material of another kind into the other compartment of said hoppers, said materials discharging from said hoppers into said mixing chambers, means for imparting a rotary movement to said materials to effect mixing thereof, a chute communicating with each of said mixing chambers into which the mixed materials are deposited and means for simultaneously adjusting said partitions whereby the proportions of the materials entering said hoppers may be simultaneously varied.

2. In a device of the class described, the combination of a hopper having a receiving chamber and a mixing chamber, adjustable means for dividing said receiving chamber into two compartments, an automatic weighing and delivery apparatus positioned above said receiving chamber, said apparatus comprising two or more containers, each of said containers being adapted to receive a different kind of material, the material of one of said containers being deposited into one of said compartments and the material of another of said containers being deposited into the other of said compartments, said materials being discharged from said receiving chamber into said mixing chamber, means for imparting a rotary movement to said materials causing mixing thereof, and a chute into which said mixed materials are deposited.

3. In a device of the class described, the combination of one or more hoppers arranged in side to side relation, each of said hoppers having a receiving chamber and mixing chamber, an adjustable partition provided in the receiving chamber of each of said hoppers, means for depositing material of one kind into one of said compartments of each hopper, means for depositing material of another kind to the other of said compartments, and means for simultaneously adjusting said partitions to vary the proportions of said materials discharging from said hoppers.

4. In a device of the class described, the combination of a hopper having a receiving chamber and a mixing chamber, adjustable means for dividing said receiving chamber into two compartments, means for depositing materials of one kind into one of said compartments, means for depositing materials of another kind into the other of said compartments, said mixing chamber being positioned to receive materials from said compartments and having a plurality of walls which intersect on edges, said walls and edges being twisted through a substantial angle from the inlet end to the outlet end thereof in such a manner that the materials passing therethrough are given a rotary movement to effect mixing thereof, and a chute into which said mixed materials are deposited.

5. In a device of the class described, the combination of a hopper having receiving chamber and a mixing chamber, an adjustable partition provided in said receiving chamber dividing the latter into two compartments, means for depositing material of one kind into one of said compartments, means for depositing material of another kind into the other of said compartments, said mixing chamber being positioned to receive materials from said compartments, and having a plurality of walls which intersect on edges, said walls and edges being twisted through a substantial angle from the inlet end to the outlet end thereof in such a manner that the materials passing therethrough are given a rotary movement to effect mixing thereof, and means for receiving said mixed materials.

6. In a device of the class described, the combination of one or more hoppers arranged in side by side relation, each of said hoppers having a receiving chamber and a mixing chamber, adjustable means provided in the receiving chamber of each of said hoppers for dividing the same into two compartments, means for depositing material of one kind into one of said compartments of each of said hoppers, means for depositing material of another kind into the other of said compartments, said mixing chambers being positioned to receive materials from the compartments of the associated hoppers and having a plurality of walls which intersect on edges, said walls and edges of said mixing chambers being twisted through an angle from the inlet ends to the outlet ends thereof, whereby the materials passing therethrough are given a rotary movement to effect mixing thereof, and a chute communicating with each of said mixing chambers into which said materials are deposited.

7. In a device of the class described, the combination of a hopper having a receiving chamber and a mixing chamber, means for dividing said receiving chamber into a plurality of compartments, each of said compartments being adapted to receive a different kind of material, said compartments communicating with said mixing chamber, having a plurality of walls which intersect on edges, said walls and edges being twisted through a substantial angle from the inlet end to the outlet end thereof, whereby the materials passing therethrough are given a rotary movement to effect mixing thereof, and a chute into which said materials are deposited.

8. In a device of the class described, the combination of a hopper having a receiving chamber and a mixing chamber, said mixing chamber comprising side and end walls which intersect on edges, said walls and edges being twisted through a substantial angle from the inlet end to the outlet end thereof, whereby the materials passing through said chamber are given a rotary movement to effect mixing thereof.

EDWARD WHEELER.